(12) United States Patent
Wilson

(10) Patent No.: US 8,449,662 B2
(45) Date of Patent: May 28, 2013

(54) DUST REPELLENT SURFACE COATING

(75) Inventor: Cherie Wilson, Lakewood, CO (US)

(73) Assignee: Pioneer Astronautics, Lakewood, CO (US)

( * ) Notice: Subject to any disclaimer, the term of this patent is extended or adjusted under 35 U.S.C. 154(b) by 172 days.

(21) Appl. No.: 12/846,636

(22) Filed: Jul. 29, 2010

(65) Prior Publication Data
US 2012/0024312 A1    Feb. 2, 2012

(51) Int. Cl.
*C09D 7/12*    (2006.01)

(52) U.S. Cl.
CPC ............ *C09D 7/1225* (2013.01); *C09D 7/1266* (2013.01); *Y10S 977/773* (2013.01)
USPC ............... 106/2; 106/481; 428/402; 428/404; 977/773

(58) Field of Classification Search
CPC .............................. C09D 7/1266; C09D 7/1225
USPC ............. 428/402, 404; 106/2, 481; 977/773
See application file for complete search history.

(56) References Cited

U.S. PATENT DOCUMENTS

| | | | |
|---|---|---|---|
| 5,958,361 A * | 9/1999 | Laine et al. | 423/610 |
| 6,586,502 B2 * | 7/2003 | Wallace et al. | 523/220 |
| 6,610,777 B1 * | 8/2003 | Anderson et al. | 524/588 |
| 7,261,647 B2 * | 8/2007 | Sullivan et al. | 473/373 |
| 7,671,109 B2 * | 3/2010 | Cheng et al. | 523/210 |
| 7,745,514 B2 * | 6/2010 | Cheng et al. | 523/336 |
| 7,947,097 B2 * | 5/2011 | You | 51/298 |
| 2002/0047058 A1 * | 4/2002 | Verhoff et al. | 241/26 |
| 2004/0170822 A1 * | 9/2004 | Rohrbaugh et al. | 428/323 |
| 2006/0246305 A1 * | 11/2006 | Cheng et al. | 428/447 |
| 2006/0257662 A1 * | 11/2006 | Bujard et al. | 428/404 |
| 2007/0149654 A1 * | 6/2007 | Cheng et al. | 523/336 |
| 2007/0285779 A1 * | 12/2007 | Walker et al. | 359/494 |
| 2010/0003520 A1 * | 1/2010 | Bujard et al. | 428/402 |
| 2010/0068523 A1 * | 3/2010 | Williams et al. | 428/403 |
| 2010/0211158 A1 * | 8/2010 | Haverty et al. | 623/1.15 |
| 2010/0221557 A1 * | 9/2010 | Higuchi et al. | 428/447 |
| 2010/0270058 A1 * | 10/2010 | Mahoney et al. | 174/250 |
| 2011/0015300 A1 * | 1/2011 | Whiteford et al. | 523/122 |
| 2011/0162287 A1 * | 7/2011 | Cai | 51/298 |
| 2011/0281068 A1 * | 11/2011 | David et al. | 428/141 |

OTHER PUBLICATIONS

Dobosz et al. (2003) "The influence of silver additives on titania photoactivity in the photooxidation of phenol" Water Research, 37:1489-1496.
Fujishima et al. (1972) "Electrochemical Photolysis of Water at a Semiconductor Electrode" Nature, 238:37-38.
Jung et al. (2008) "Enhanced photocatalytic activity of Au-buffered TiO2 thin films prepared by radio frequency magnetron sputtering" Applied Catalysis B: Environmental, 84:389-392.
Maira et al. (2000) "Size Effects in Gas-Phase Photo-oxidation of Trichloroethylene Using Nanometer-Sized Trichloroethylene Using Nanometer-Sized TiO2 Catalysts" Journal of Catalysis, 192:185-196.

(Continued)

*Primary Examiner* — Gregory Webb
(74) *Attorney, Agent, or Firm* — Merchant & Gould P.C.

(57) ABSTRACT

Provided herein are compositions for coatings that repel dust. The compositions comprise colloidal silica suspended in a low molecular weight alcohol, one or more hard nanoparticles, a fluoride source, and one or more combustible organic compounds. Methods of preparing a coating from the compositions are also provided herein.

12 Claims, 4 Drawing Sheets

OTHER PUBLICATIONS

Menesi et al. (2008) "Photocatalytic oxidation of organic pollutants on titania-clay composites" Chemosphere, 70:538-542.

Supsakulchai et al. (2003) "Performance of titanium dioxide microcapsules as a photo-oxidation catalyst for decolourization of methylene blue" Journal of Microencapsulation, 20(1):19-33.

Xiao et al. (2007) "Microstructure Control of Nanoporous Silica Thin Film Prepared by Sol-gel Process" J. Mater. Sci. Technol., 23(4):504-508.

Zhang et al. (1998) "Role of Particle Size in Nanocrystalline $TiO_2$-Based Photocatalysts" J. Phys. Chem. B, 102:10871-10878.

* cited by examiner

Before ultraviolet irradiation:

After ultraviolet irradiation:

Uncoated Stainless Steel 316 Surface Exposed to Dust

Coated Stainless Steel 316 Surface Exposed to Dust

US 8,449,662 B2

DUST REPELLENT SURFACE COATING

TECHNICAL FIELD

The present disclosure relates to coatings, and in particular, dust repellent coatings.

BACKGROUND

The statements in this section merely provide background information related to the present disclosure and may not constitute prior art.

Attachment of mineral dust particles to equipment causes increased wear, interferes with smooth contact between surfaces, causes contamination, allows undesirable migration of dust, and results in higher costs of maintenance and operation. Superfine particles stick to surfaces through electrostatic and Van der Waals forces, making removal difficult and expensive.

The present invention is directed toward overcoming one or more of the problems discussed above.

SUMMARY

Provided herein are innovations with respect to dust repellent coating compositions.

In some embodiments, the composition comprises a colloidal silica, for example, a chain structured silica organosol suspended in a low molecular weight alcohol or a fumed silica suspended in a low molecular weight alcohol, one or more hard nanoparticles, for example, titania or zirconia nanoparticles, and one or more combustible organic compounds.

In other embodiments, the composition further comprises a fluoride source.

In some aspects, the coating can comprise a colloidal suspension of hydrofluoric acid catalyzed titania organosol or zirconia organosol and a chain-structured aggregate organic colloidal silica sol. In other aspects, the chain structured silica is fumed silica powder, suspended in a low molecular weight alcohol. In other aspects, the chain structured fumed silica has the silica surface modified by hexamethyldisilazane. In other aspects, the titania nanoparticles or zirconia nanoparticles are a dry powder.

Also provided are methods for preparing coating compositions. In some embodiments, the method comprises: providing a colloidal silica suspended in a low molecular weight alcohol; adding hard nanoparticles such as titania nanoparticles or zirconia nanoparticles screened for a submicron particle size; and adding one or more combustible organic compounds. In some embodiments, the composition further comprises a fluoride source. In some aspects, the composition is annealed to the surface of a material in need of such coating.

Further provided herein are methods of removing dust particles. In some embodiments, the method comprises: applying a composition to a surface of a material, wherein the composition comprises a colloidal silica suspended in a low molecular weight alcohol, one or more hard nanoparticles, and one or more combustible organic compounds; allowing the composition to air dry; exposing the material to dust; and tilting, vibrating, exposing to ultraviolet light, and/or blowing the coated surface to shake or dislodge the dust from the surface of the material.

In some aspects, the composition is annealed to the surface of the material.

In some aspects, the composition is applied to a fibrous or porous material, such as, for example, a filter. In other aspects, the composition is applied to a solid material.

Still further provided are methods of oxidizing organic molecules and methods for dislodging molecules by photo-activation of compositions described herein.

These and other features as well as advantages which characterize the invention will be apparent from a reading of the following detailed description and a review of the appended claims.

BRIEF DESCRIPTION OF THE DRAWINGS

The drawings described herein are for illustration purposes only and not intended to limit the scope of the present disclosure in any way.

DETAILED DESCRIPTION

Figure 1:
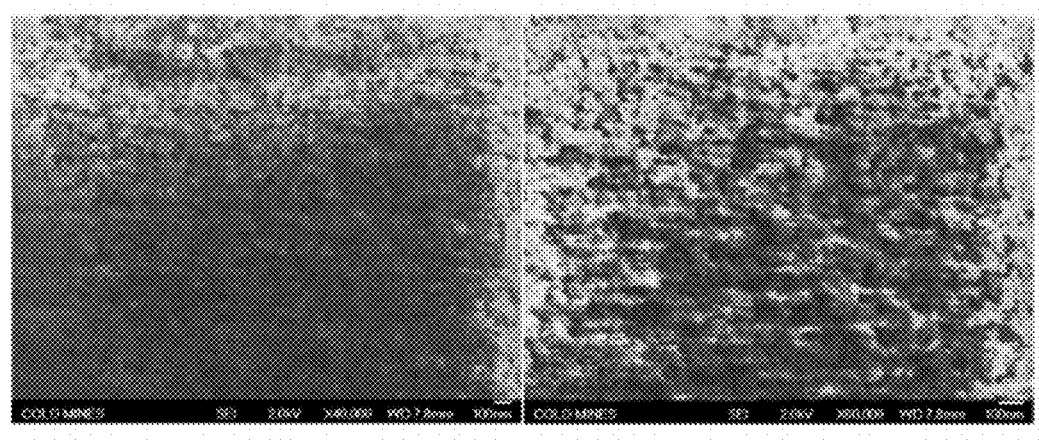
FIG. 1 provides scanning electron micrographs illustrating the pores in a coating containing titania nanoparticles (2 magnifications, 40,000× and 60,000×).
Figure 2:
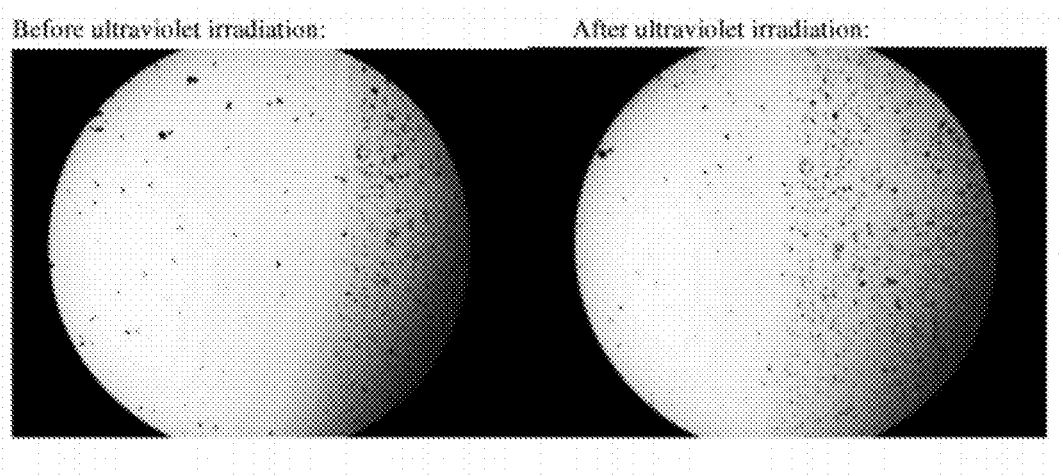
FIG. 2 shows photoactivity for the dust repellent coating indicating that submicron dust particles placed on a coated horizontal surface could detach and move when the coated surface was illuminated with ultraviolet light. In contrast, dust particles on an uncoated surface were unresponsive to ultraviolet light. The 2 photomicrographs show the position of dust particles before and after ultraviolet irradiation.
Figure 3:
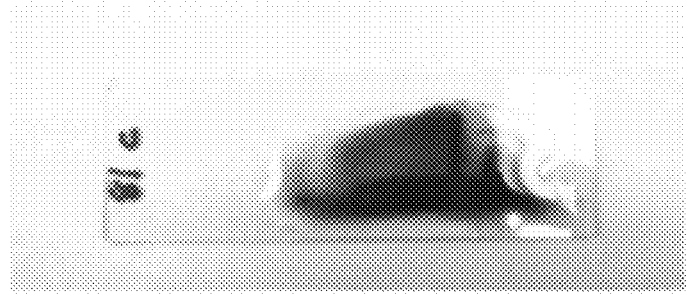
FIG. 3 demonstrates a qualitative test of photo-oxidation of methylene blue (A. Supsakulchai, G H Ma, M. Nagai, S. Omi, J. Microencapsul. Vol. 20(1), (2003) 19). One drop of 1% methylene blue (3,4-bis(dimethyl amino)-phenothiazine-5-thionum chloride) and 4 drops of dilute peroxide ($H_2O_2$) were placed on top of a coated glass slide, then exposed to 10 minutes of ultraviolet irradiation. Hydrogen peroxide was used as the source of oxygen for the catalytic reaction. Decolorization of methylene blue indicates photo-oxidation did occur.
Figure 3:
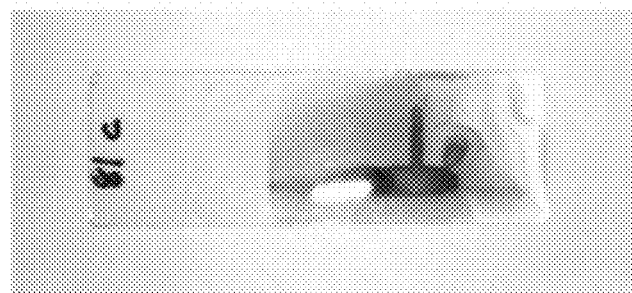

The following description is merely exemplary in nature and is in no way intended to limit the present disclosure, application, or uses.

Compositions, Uses, and Methods of Preparing

Provided herein are compositions for repelling and/or removing dust. Such compositions have industrial, military, and other applications. The dust repellent composition is a coating envisioned for use in a number of different environments, including, for example: in dry environments such as mining; in manufacturing operations; in military operations in the desert; in a vacuum, for example, in space. Other environments are contemplated herein and envisioned to be within the scope of the present disclosure as long as the compositions and methods are operational in the environment.

The coating compositions described herein are inorganic and contain no polymers which can degrade in sunlight or anti-static agents. Some coating embodiments also have photoactive properties. Coating compositions can be applied to stationary fibrous surfaces such as air filters so that dust is easily removed from the filter surface by vibration or reverse air flow, enabling filter reuse or extending filter life. Coating compositions can also be applied to any clean hard noncombustible surface, for example, metal surfaces, or non-metal surfaces. Illustrative surfaces include metal, glass, ceramics, minerals, some manufactured mixed solids such as building materials, polymers, etc. In some embodiments, the surface to which the coating is applied should be able to withstand the annealing process without damage. In other embodiments where the surface will be damaged by the annealing process, the coating will be air-dried onto the surface (as described herein).

Compositions herein comprise, consist of, or consist essentially of one or more of a colloidal silica, hard nanoparticles such as titania and/or zirconia particles, a combustible organic compound, and optionally a compound which contributes electronegative fluoride such as hydrofluoric acid or magnesium fluoride. Additives to the colloidal silica provide the composition with hardness and/or photoactivity.

In some embodiments, the colloidal silica is a chain structured silica organosol prepared by the sol gel method. Yiqun XIAO, Jun SHEN, Zhiyong XIE, Bin ZHOU and Guangming WU, "Microstructure Control of Nanoporous Silica Thin Film Prepared by Sol-gel Process" J. Mater. Sci. Technol., Vol. 23, No. 4, 2007, p. 504. The chain structured colloidal silica can be linear or branched aggregates. The chain structured colloidal silica is suspended in a low molecular weight alcohol which evaporates after coating. The organic portion of the sol is a combustible organic substance such as a fatty acid. Chain structured silica organosols are known to those skilled in the art and are commercially available.

In other embodiments, the colloidal silica is a fumed silica suspended in a low molecular weight alcohol. Fumed silicas are known to those skilled in the art and are commercially available.

Both silica preparations are normally too fragile and brittle to be useful as a coating. Aqueous silica organosols fail to adhere to hydrophobic surfaces such as metals. Such coatings typically crack and flake off from surfaces they are applied to, even when dipcoated as thin films. Typical silica organosols contain discrete particles, and are not useful for these applications because they lack the unifying microstructure provided by chain-structured silica aggregates found in both organosols and fumed silica. Nissan Chemical America manufactures a product called IPA-ST-UP and Cabot Corporation manufactures chain structured fumed silica which could be functionally equivalent to Nissan's product if it were suspended in a low molecular weight alcohol. Both products may be used as a source of chain-structured aggregated silica. The modifications to the commercial silica preparations and method of preparation and application described herein enable practical uses of the silica preparations which are not otherwise possible. In particular, conceived of and disclosed herein are compositions that provide dust repulsion and photoactivity, and facilitate dust removal.

The low molecular weight alcohol can include but is not limited to methyl, ethyl, propyl, butyl, and pentyl alcohols and all of their isomers. An illustrative low molecular weight alcohol is isopropanol. The low molecular weight alcohol can be specific to the method of the sol process, i.e. the making of the sol gel. Typically, the low molecular weight alcohol evaporates after the coating application. An illustrative composition is Nissan's IPA-ST-UP which is about 15% or 16% silica by weight to isopropanol.

In some embodiments, the composition includes nanoparticles of materials which confer hardness to the coating, for example, titania or zirconia and magnesium fluoride that have been screened to limit the particle size to submicron particles. Failure to limit the particle size can, in some embodiments, result in crack initiation in the coating caused by larger particles. The amount of nanoparticles can be increased if additional coating hardness or durability is desired. An example of a coating composition with a lower hardness level is a silica organosol that contains 0.1 wt % colloidal dispersion of hydrofluoric acid catalyzed titania and magnesium fluoride to the silica organosol along with 0.001 wt % stearic acid. The resulting hardness value of 0.256 GPa with modulus/indentation depth of 3.595 GPa/500 nm was obtained after annealing at 400° C. In still other embodiments, the nanoparticles have a diameter which is smaller than the thickness of the annealed coating. The nanoparticles should be smaller than the thickness of the coating or the coating will crack.

Options for increasing the hardness in the coating compositions herein include, for example, any of the following nanomaterials, singly or in combination:

| Nanomaterial with high hardness | Source |
| --- | --- |
| Alumina, alpha ($Al_2O_3$) | Amplex Diamond Products |
| Alumina, gamma ($Al_2O_3$) | Inframet Advanced Materials |
| Boron carbide (BC) | PlasmaChem |
| Diamond (C) | Amplex Diamond Products; PlasmaChem |
| Quartz Silica, micronized ($SiO_2$) | RGe |
| Silicon Carbide (SC) | PlasmaChem |
| Silicon Nitride (SiN) | PlasmaChem |
| Titania ($TiO_2$) | PlasmaChem |
| Titanium Carbon Nitride (TiCN) | PlasmaChem |
| Titanium Diboride ($TiB_2$) | PlasmaChem |
| Zirconia ($ZrO_2$) | RGe; Saint-Gobain Ceramic Materials, Superabrasives |

The quantity of nanoparticles added for hardness should be limited to a quantity that does not destroy the pore structure of the coating. Pores are shown in the scanning electron micrographs of FIG. 1 for a coating containing titania nanoparticles (2 magnifications, 40,000× and 60,000×). A typical pore size is about 10 nm and pores are usually less than about 50 nm.

The specified annealing temperature range is from about 350° C. to about 750° C., for example, about 400° C., about 450° C., about 500° C., about 550° C., about 600° C., about 650° C., or about 700° C., and any temperature in between. The temperature ramp rate and holding time at temperature can be varied, with a longer time preference for lower temperatures to insure that organic materials and other volatiles are removed from the coating. An illustrative annealing regime for the improved coating is 5° C./min ramp rate to 400° C., with the muffle furnace turned off at 400° C. and the muffle furnace allowed to equilibrate to room temperature prior to opening. Other ramp rates range from about 1° C./min to about 15° C./min, for example, about 1° C./min, about 2° C./min, about 3° C./min, about 4° C./min, about 6° C./min, about 7° C./min, about 8° C./min, about 9° C./min, about 10° C./min, about 11° C./min, about 12° C./min, about 13° C./min, about 14° C./min, or about 15° C./min. Annealing under inert gas, such as nitrogen, prevents oxidation of metal surfaces. Annealing under inert gas is not necessary for solid materials, such as glass, that will not oxidize during annealing. In such cases, the annealing is performed in the presence of air.

A combustible organic compound such as an organic fatty acid can be added to help retain the coating nanostructure during annealing formed by the colloidal silica. The combustible organic compound does not evaporate, but volatilizes or burns off during annealing and helps limit densification of the coating and loss of the coating microstructure. While not wanting to be held by theory, the porous nanostructure is believed to play a role in dust repellency since dust is not repelled by annealed coatings that omit the combustible organic compound or colloidal silica that contain discrete silica particles.

Stearic acid, an exemplary organic fatty acid, has a flash point of 196° C. and autoignition temperature of 395° C. So, if the annealing temperature is 400° C., all of the stearic acid should burn off. A large array of combustible organic compounds exist that will work similarly to stearic acid.

Thus, selection of a suitable combustible organic compound can be based on the following criteria: solubility in a low molecular weight alcohol (a polar organic); ability to disperse in the mixture; an autoignition temperature or boiling point below the selected annealing temperature; a low vapor pressure such that the combustible organic compound does not evaporate prior to annealing (the vapor pressure of stearic acid is: 1 mm Hg @ 173.7° C.); low toxicity (non-toxic and does not generate toxic compounds during combustion or evaporation); desirable combustion products such as carbon dioxide and water; and low cost.

Generally, autoignition temperatures go down as molecular weight goes up and, generally, branched organic compounds have higher autoignition temperatures. The autoignition temperature of most animal fats is in the 288-316° C. range, compared to most vegetable oils, which are above 363° C. If the boiling point and autoignition temperatures are relatively close to the annealing temperature, the combustible organic compound will be removed slowly from the coating during the annealing process, helping to preserve the coating microstructure. Boiling points and autoignition temperatures that are low relative to the selected annealing temperature will cause the combustible organic compound to flash off from the coating rapidly, possibly resulting in a more dense coating with loss of microstructure and a decreased ability of the coating to repel dust.

An illustrative fatty acid mixture is made by Vantage Oleochemicals, Voleic™ 6905 Oleic Acid. This is a mixture of saturated and unsaturated straight chain aliphatic monocarboxylic acids, mainly oleic acid ($C_{18}H_{34}O_2$). The autoignition temperature is 350° C. and the boiling point is 220° C. In this case the annealing temperature could be lower (just above 350° C.). A lower annealing temperature would also reduce the speed at which the compound would be lost from the coating by boiling off.

When the Van der Pauw 4 probe method was used to measure sheet resistivity of the coating, it was found that the coating behaved like an insulator, giving "overflow" readings. Dissipation of electron beam energy through pores was visible under the electron microscope, while areas without pores became charged, providing evidence that the improved coating nanostructure affects electrical properties of the coating. Fine mineral dust is problematic because it becomes charged and adheres to surfaces through electrostatic attraction and van der Waals forces. Van der Waals forces only come into play when charged dust particles are able to make a close approach to the surface. Additionally, optional inclusion of about 0.001 to about 3 wt % filtered magnesium fluoride nanoparticles and/or optional use of hydrofluoric acid for organosol gel catalysis contributes highly electronegative fluoride to the improved coating. Fluoride can mitigate van der Waals forces.

Compositions in accordance with the present disclosure should anneal to a hard surface without development of significant cracks. Significant cracks are defined as cracks which propagate through the coating or cause fracturing with the loss of coating integrity, or cracks which emanate from included particulates.

The colloidal silica can have a pH between about 1 and about 6, for example, between about 1 and about 5, between about 2 and about 6, between about 2 and about 5, etc. Specific pHs within each range are also contemplated herein.

When the combustible organic compound is an organic fatty acid, the organic fatty acid can be included in the composition in an amount of at least about 0.001 to about 0.1 wt % of the total ingredients, for example, about 0.001 wt %, about 0.05 to about 0.1 wt %, about 0.03 to about 0.07 wt %, etc. Specific levels within each range are also contemplated herein.

The fluoride source can be included in the composition in an amount of at least about 0.05 to about 0.5 wt % of the total ingredients, for example, about 0.05 to about 0.1 wt %, about 0.08 to about 0.05 wt %, about 0.1 to about 0.5 wt %, etc. Specific amounts of fluoride source falling within each range are also contemplated herein.

The thickness of the improved coating can be controlled by the application of the coating (coating application). For example, after annealing of a first coating, a second coating can be applied to the article if a thicker coating is desired. When a flat metal sheet is dip coated (a self-metered method that depends on the coating meniscus) with a withdrawal rate of approximately 5 inches/minute, a final coating thickness of approximately 1-2 μm may be obtained for a formulation with a low concentration of additives (less than about 1 wt %). Three consecutive annealed coatings on an article produced a coating thickness of approximately 5-6 μm after annealing each coat at 400° C. At higher temperatures, the coating will be thinner. Other controlled coating application techniques such as spray coating, spin coating, brushing, or pre-metered methods are contemplated herein. Vacuum deposition methods present an opportunity to fine-tune the coating structure and composition for a particular application by inserting component layers before or after the annealing step. Choice of application method should also consider the degree of particle stratification that is desired for the application. For example, the dip-coating method causes the hard particles to sink toward the bottom of the coating, making the coating hardness non-uniform when smaller amounts of the hard particles are used in the coating. However, for dust repulsion, an advantage of having the hard nanoparticles such as titania near the bottom is that much of the surface will be electrically insulative. If the desired application is for photoactivity, both higher concentrations of titania nanoparticles and a rapid-dry, more even particle dispersion coating method may be preferred.

If dip-coating is used, the rate of article withdrawal from the liquid coating can be consistently and carefully controlled to limit coating thickness to less than about 10 μm. If thicker coatings are desired, the article can be annealed and dip-coated again. If spraying or other coating method is used, the application method can be controlled such that a uniform coating thickness of less than about 10 μm is obtained for each application prior to annealing.

The coating composition can be applied in as many steps as necessary to obtain the desired thickness. In some aspects, the steps of applying and annealing are performed several times, for example, twice, three times, four times, five times, etc.

Provided herein is a method for preparing a coating composition. The method comprises: (a) providing a colloidal silica suspended in a low molecular weight alcohol; (b) adding one or more hard nanoparticles screened for submicron particle size; and (c) adding one or more combustible organic compounds. The amount of nanoparticles in the composition can be varied to achieve the desired coating hardness. Various aspects of this method are as described with respect to other embodiments herein.

Also provided herein is a method for preparing a colloidal silica thin film coating that repels dust. In some embodiments, the method comprises providing a colloidal silica suspended in a low molecular weight alcohol; adding hard nanoparticles such as titania nanoparticles or zirconia nanoparticles screened for a submicron particle size; and adding one or more combustible organic compounds. The thin film coating can be applied to the surface of a material to repel dust particles, for example, dry mineral dust particles. Various aspects of this method are as described with respect to other embodiments herein.

Unlike unmodified colloidal silica coatings, the improved coating is wettable without inducing crack formation. The formulation provides coating adherence to hydrophobic surfaces by selecting nonaqueous media for the colloidal suspension.

When applied to stationary fibrous or porous materials such as filters, the improved coating is not necessarily subjected to annealing. The coating may be brushed or sprayed onto the filter surface that will face the dust exposure and then air dried.

In some embodiments, vibration, reverse air flow, and/or ultraviolet irradiation is used to shake or dislodge dust from the coated filter material.

The improved coating surface can be sputter-coated with gold. The gold coating passivates the coating surface chemistry after air is removed, allowing the coating to retain dust repellent properties when used under vacuum. In some embodiments, the step of sputter coating lasts for about 10 seconds. Other methods for applying a passivating layer of gold are also contemplated herein. Mineral dust can be repelled under vacuum conditions in space or in an extraplanetary environment.

Thus, provided herein is a method of repelling dust. In some embodiments, the method comprises applying a composition to the surface of a material, wherein the composition comprises a colloidal silica suspended in a low molecular weight alcohol, hard nanoparticles such as titania or zirconia nanoparticles, and one or more combustible organic compounds; and allowing the composition to air dry.

In some aspects, the method of repelling dust comprises: (a) applying a composition to a surface of a solid material, wherein the composition comprises a colloidal silica suspended in a low molecular weight alcohol, one or more hard nanoparticles, and one or more combustible organic compounds; (b) allowing the composition to air dry; (c) exposing the material to dust; and (d) tilting, vibrating, exposing to ultraviolet light, and/or blowing the coated surface to shake or dislodge the dust from the surface of the coated material. The material can be, for example, glass, metal, ceramics, minerals, or manufactured mixed solids. The composition can be applied by spraying, dip-coating, or brushing the composition onto the surface of the material. In some embodiments, the method further comprises annealing the composition to the surface of the material.

The improved coating has photoactivity in the ultraviolet wavelength range, or about 10 to about 400 nm. Titania thin films have been used for applications in photocatalysis such as oxidation of polymers, dye-sensitized photoelectrochemical cells, electrochromic devices, and sensors, but one of the most significant uses is degradation of organic pollutants, for example, in wastewater treatment plants or industrial manufacturing processes. Photocatalytic oxidation of organic pollutants is accomplished by spreading layers of titania/Ca-montmorillonite suspensions on the glass surface of a double-walled photoreactor (J. Menesi, L. Korosi, E. Bazso, V. Zollmer, A. Richardt, and I. Dekany, Chemosphere, (2007)). In this case, the montmorillonite enhanced the activity of the titania. A similar effect will occur with the dust repellent coating because the porous microstructure has similar properties to clays such as montmorillonite.

Photo-catalysis by titania under ultraviolet light was discovered in 1967 by Dr. Fujishima and published in *Nature* in 1972. In later work with Dr. Toshiya Watanabe, this property was exploited to develop titania-coated anti-bacterial tiles and to decompose surface oils and to remove oils easily from a coated surface by exploiting the hydrophilic properties that caused oil to float off the coating surface on an adherent layer of water.

Titania (titanium IV dioxide) supported in silica (silicon dioxide) is useful for photo-oxidation of various organic compounds such as trichloroethylene, methanol, phenol, toluene, formaldehyde, and others. The ultra-violet region of the electromagnetic spectrum provides the chemical energy for the titania-catalyzed reaction. Titania particles approximately 10 nm in size have been reported to produce the highest oxidation rates (Z. B. Zhang, C. C. Wang, R. Zakaria, J. Y. Ying, J. Phys. Chem., B 102 (1998) 10871; A. J. Maira, K. L. Yeung, C. Y. Lee, P. L. Yue, and C. K. Chan, Journal of Catalysis, 192: 185-196 (2000)). Such oxidations have been performed in liquid and vapor phase substrates. In some instances, activity is enhanced by the addition of promoters such as silver (A. Dobosz and A. Sobczynski, Water Research, Vol. 37, Iss. 7, (2003), 1489) or gold (J. M. Jung, M. Wang, E. J. Kim, C. Park, and S. H. Hahn, Applied Catalysis B: Environmental, Vol. 84, Iss. 3-4, (2008), 389).

In the case of the improved coating, the photoactivity causes fine dust particles on the improved coating surface to move when exposed to ultraviolet light, presenting an opportunity for particle removal. Of the three polymorphs of titania (anatase, brookite, and rutile), anatase has superior photocatalytic activity. The anatase phase typically exists at temperatures below 800° C. for organosol gel titania particles, which is within the specified annealing temperature range of 350° C. to 750° C. The dispersement of discrete nanoparticles such as titania within the silicon dioxide framework prevents particle aggregation and formation of large crystals during annealing. Exploitation of the photoactivity of the improved coating for catalytic photo-oxidation is contemplated herein.

In some embodiments, the concentration of titania and polymorph of titania are optimized for desired photoactivity by controlling the amount of titania added so that particles remain separated within and on the silicon dioxide framework and the annealing temperature is low enough (less than 800° C.) to prevent the transformation of anatase to rutile. Addition of titania particles in a larger quantity to the coating mixture reduces photo-oxidation time.

The coating compositions herein can be used for repelling dust on surfaces, for example, a noncombustible hard surface, a fibrous surface, a porous surface, and/or a hydrophobic surface.

As such, provided herein is a method of removing dust particles. In some embodiments, the method of removing dust particles from a surface comprises: (a) applying a composition to the surface of a material, wherein the composition comprises a colloidal silica suspended in a low molecular weight alcohol, one or more hard nanoparticles, and one or more combustible organic compounds; (b) allowing the composition to air dry; and (c) photoactivating the dried composition to move the dust particles settled on the surface of the material. Other aspects of this method are as described with respect to other embodiments herein.

In other embodiments, the method of removing dust particles comprises: (a) applying a composition to a surface of a material that can be used as a filter, wherein the composition comprises a colloidal silica suspended in a low molecular weight alcohol, one or more hard nanoparticles, and one or more combustible organic compounds; (b) allowing the composition to air dry; (c) exposing the material to dust; and (d) tilting, vibrating, exposing to ultraviolet light, and/or blowing the coated surface to shake or dislodge the dust from the surface of the material. In some aspects, the material is a stationary fibrous or porous material. The composition can be applied by spraying, dip-coating, or brushing the composition onto the surface of the material. Other aspects of this method are as described with respect to other embodiments herein.

Provided herein is a method of oxidizing organic molecules. The method comprises: (a) applying a composition to the surface of a solid material, wherein the composition comprises a colloidal silica suspended in a low molecular weight alcohol, titania nanoparticles, and one or more combustible organic compounds; (b) allowing the composition to air dry; (c) placing the organic molecules in contact with the dried composition; and (d) photoactivating the composition to oxidize the organic molecules. In some embodiments, the composition is annealed to the surface. Other aspects of this method are as described with respect to other embodiments herein.

Illustratively, photooxidation of trichloroethylene (TCE) can be achieved using ultraviolet illumination of air containing TCE in a UV photoreactor. The reactor wall is coated with a composition described herein, for example, a composition comprising (i) colloidal silica suspended in a low molecular weight alcohol, (ii) titania nanoparticles, and (iii) one or more combustible organic compounds. Ultraviolet illumination can be provided by low pressure mercury lamps with outputs at, for example, 254 nm, 365 nm, or 185/254 nm. Oxidation by-products include phosgene, along with trace amounts of chloroform and carbon tetrachloride.

It is further contemplated that other organic molecules can be oxidized using photooxidation in combination with compositions disclosed herein. Such organic molecules include, but are not limited to, benzene, trichloroethane, phenol, toluene, methanol, isohexane, nitromethane, acetonitrile, acrylonitrile, acetamide, methyl sulfide, carbonyl sulfide, and carbon disulfide.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

All references cited herein are incorporated by reference in their entirety and to the same extent as if each individual publication or patent application was specifically and individually indicated to be incorporated by reference.

EXAMPLE

The following example is provided for illustrative purposes only and is not intended to limit the scope of the invention.

Figure 4:
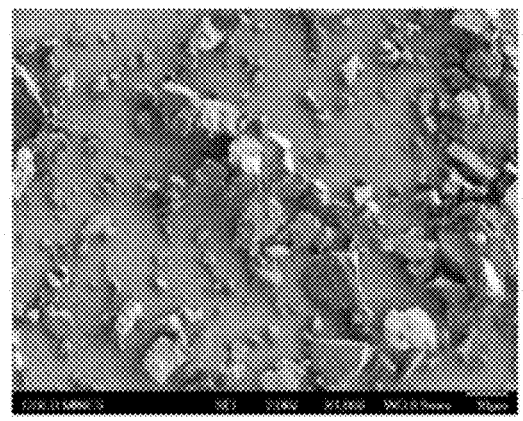
FIG. 4 is a comparison of two surfaces, one uncoated surface and the other surface coated with a composition according to the present description. Both surfaces were exposed to dust but only the coated stainless steel surface is dust free.
Figure 4:
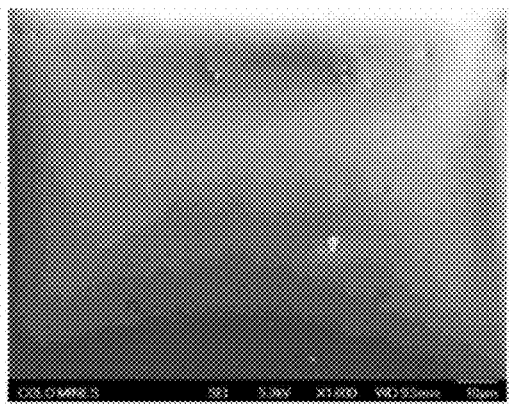

In experiments to date, the selected commercial colloidal silica modified for these applications has chain structured particles with a chain length between 9 and 100 nm and is manufactured by Nissan Chemical America Corporation and designated IPA-ST-UP. This organosol with the additives and processing described herein was tested in air and under vacuum conditions ($10^{-4}$ Torr) and found to be very effective at repelling basalt dust containing a high proportion of micron and sub-micron particles which are typically the most problematic for dust adhesion. An electron microscope was used to provide images of coated and uncoated stainless steel surfaces, verifying the ability of the modified coating to repel both macroscopic and microscopic mineral dust. These images are shown in FIG. 4.

The description of the present invention has been presented for purposes of illustration and description, but is not intended to be exhaustive or limiting of the invention to the form disclosed. The scope of the present invention is limited only by the scope of the claims. Many modifications and variations will be apparent to those of ordinary skill in the art. The embodiment described was chosen in order to best explain the principles of the invention, the practical application, and to enable others of ordinary skill in the art to understand the invention for various embodiments with various modifications as are suited to the particular use contemplated.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

All references cited above are incorporated herein by reference in their entirety.

The words "comprise", "comprises", and "comprising" are to be interpreted inclusively rather than exclusively.

What is claimed is:

1. A dust repellent coating comprising chain-structured aggregate colloidal silica suspended in a low molecular weight alcohol, one or more hard nanoparticles, and one or more combustible organic compounds.

2. The coating of claim 1, wherein the nanoparticles are selected from the group consisting of alpha alumina, gamma alumina, boron carbide, diamond, micronized quartz silica, silicon carbide, silicon nitride, titania, titanium carbon nitride, titanium diboride, zirconia, and mixtures thereof.

3. The coating of claim 1, wherein the nanoparticles have a diameter which is smaller than the thickness of the coating as measured after annealing.

4. The coating of claim 1, wherein the one or more combustible organic compounds is a fatty acid.

5. The coating of claim 4, wherein the fatty acid is stearic acid, oleic acid, or a mixture of one or more fatty acids.

6. The coating of claim 1, further comprising a fluoride source.

7. The coating of claim 6, wherein the fluoride source is selected from the group consisting of magnesium fluoride nanoparticles, hydrofluoric acid, hydrofluoric acid catalyzed titania organosol, and hydrofluoric acid catalyzed zirconia organosol.

8. The coating of claim 1, wherein the one or more hard nanoparticles are titania nanoparticles, zirconia nanoparticles, or mixtures thereof, and wherein the nanoparticles are a dry powder.

9. A dust repellent coating comprising chain-structured fumed silica suspended in a low molecular weight alcohol, one or more hard nanoparticles, and one or more combustible organic compounds.

10. The coating of claim 9, wherein the nanoparticles are selected from the group consisting of alpha alumina, gamma alumina, boron carbide, diamond, micronized quartz silica, silicon carbide, silicon nitride, titania, titanium carbon nitride, titanium diboride, zirconia, and mixtures thereof.

11. The coating of claim 9, wherein the one or more combustible organic compounds is a fatty acid.

12. The coating of claim 4, wherein the fatty acid is a mixture of saturated and unsaturated straight chain aliphatic monocarboxylic acids.

* * * * *